United States Patent
D'Anna et al.

(10) Patent No.: US 9,452,830 B2
(45) Date of Patent: Sep. 27, 2016

(54) CONSTANT VELOCITY DRIVE FOR TILT ROTOR ASSEMBLY

(71) Applicant: Sikorsky Aircraft Corporation, Stratford, CT (US)

(72) Inventors: Frank P. D'Anna, Seymour, CT (US); David A. Darrow, Jr., Stratford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 174 days.

(21) Appl. No.: 14/153,482

(22) Filed: Jan. 13, 2014

(65) Prior Publication Data

US 2015/0197332 A1   Jul. 16, 2015

(51) Int. Cl.
| | |
|---|---|
| *B64C 27/00* | (2006.01) |
| *B64C 27/14* | (2006.01) |
| *B64C 27/35* | (2006.01) |
| *B64C 27/41* | (2006.01) |
| *B64C 27/06* | (2006.01) |
| *B64C 27/32* | (2006.01) |
| *F16D 3/50* | (2006.01) |
| *F16D 3/30* | (2006.01) |
| *F16D 3/70* | (2006.01) |

(52) U.S. Cl.
CPC ............. *B64C 27/14* (2013.01); *B64C 27/06* (2013.01); *B64C 27/32* (2013.01); *B64C 27/35* (2013.01); *B64C 27/41* (2013.01); *F16D 3/50* (2013.01); *F16D 3/30* (2013.01); *F16D 3/70* (2013.01)

(58) Field of Classification Search
CPC ........... F16D 3/30; F16D 3/33; B64C 27/06; B64C 27/14; B64C 27/32; B64C 27/35; B64C 27/41
See application file for complete search history.

(56) References Cited

U.S. PATENT DOCUMENTS

| | | | |
|---|---|---|---|
| 3,804,552 A | 4/1974 | Covington | |
| 3,841,586 A | 10/1974 | Broadley et al. | |
| 4,087,203 A * | 5/1978 | Ferris | B64C 27/35 416/134 A |
| 4,251,187 A * | 2/1981 | Hollrock | B64C 27/35 403/226 |
| 4,695,227 A | 9/1987 | Head et al. | |
| 5,083,725 A | 1/1992 | Byrnes et al. | |
| 5,092,738 A * | 3/1992 | Byrnes | B64C 27/51 416/134 A |
| 5,135,357 A * | 8/1992 | Pancotti | B64C 27/35 416/131 |

(Continued)

FOREIGN PATENT DOCUMENTS

| | | |
|---|---|---|
| GB | 2141208 A. | 12/1984 |
| WO | 2008020848 A2 | 2/2008 |
| WO | 2010128378 A2 | 11/2010 |

OTHER PUBLICATIONS

European Search Report, Application No. 14192827.5-1754; Mail Date Jun. 12, 2015; 6 pages.

*Primary Examiner* — Philip J Bonzell
(74) *Attorney, Agent, or Firm* — Cantor Colburn LLP

(57) ABSTRACT

A constant velocity drive includes a drive ring and a driven ring positioned around the drive ring. Drive links extend from the drive ring to the driven ring to transfer torque applied at the drive ring to the driven ring. Elastomeric bearings are positioned at the driven ring to transfer torque from a drive link of the plurality of drive links to the driven ring. Each elastomeric bearing includes both spherical bearing elements and planar bearing elements to allow for tilt of an axis of rotation of the driven ring with respect to an axis of rotation of the drive ring while ensuring a constant rotational velocity of the driven ring with respect to the rotational velocity of the drive ring.

17 Claims, 5 Drawing Sheets

(56) References Cited

U.S. PATENT DOCUMENTS

| | | | |
|---|---|---|---|
| 5,145,321 A | 9/1992 | Flux et al. | |
| 5,188,513 A * | 2/1993 | Byrnes | F16F 3/093 267/140.4 |
| 5,460,487 A * | 10/1995 | Schmaling | B64C 27/35 267/140.2 |
| 5,499,903 A * | 3/1996 | Schmaling | B64C 27/35 416/134 A |
| 5,913,659 A * | 6/1999 | Doolin | B64C 27/008 267/141.4 |
| 6,695,254 B2 | 2/2004 | Zoppitelli et al. | |
| 6,712,313 B2 | 3/2004 | Zoppitelli et al. | |
| 8,029,371 B2 * | 10/2011 | Stamps | B64C 27/32 416/134 A |
| 8,226,355 B2 * | 7/2012 | Stamps | B64C 27/32 415/119 |
| 8,444,382 B2 * | 5/2013 | Stamps | B64C 27/37 416/1 |
| 2003/0178528 A1 | 9/2003 | Zoppitelli et al. | |
| 2011/0027083 A1 * | 2/2011 | Stamps | F16F 13/08 416/107 |

\* cited by examiner

CONSTANT VELOCITY DRIVE FOR TILT ROTOR ASSEMBLY

FEDERAL RESEARCH STATEMENT

This invention was made with Government support under Agreement No. W911W6-11-2-0007 for the Joint Multi-Role Demonstrator Configuration Trades and Analysis. The Government has certain rights in the invention

BACKGROUND

The subject matter disclosed herein generally relates to rotors for aircraft use. More specifically, the subject disclosure relates to tilting rotors for helicopters or other rotorcraft.

In helicopters or other rotorcraft, a rotor assembly has an axis of rotation, and a plurality of radially extending rotor blades rotating in a plane of rotation. This plane of rotation is nominally perpendicular to the axis of rotation. In some rotorcraft, and under certain operating conditions, it is desired to tilt the plane of rotation so it is no longer perpendicular to the axis of rotation. Rotor assemblies with this capability are often called gimbal rotors and are used in both conventional helicopter applications as a main rotor or as a rotor/propeller in a tilt wing or tilt rotor vertical takeoff and landing (VTOL) aircraft.

To minimize coriolis forces acting on rotating tilted rotor assemblies, a constant velocity joint is utilized to connect the rotor shaft to the rotor assembly to allow the rotor to tilt while maintaining a constant rotational velocity. Previous configurations of such constant velocity joints are complex and have a large envelope and typically increase system weight significantly.

BRIEF DESCRIPTION

In one embodiment, a constant velocity drive includes a drive ring having a drive ring axis of rotation and a driven ring positioned around the drive ring and which is driven by the drive ring to rotate about a driven ring axis of rotation. A plurality of drive links extend from the drive ring to the driven ring to transfer torque applied at the drive ring to the driven ring. A plurality of elastomeric bearings are positioned at the driven ring to transfer torque from one of the plurality of drive links to the driven ring. Each elastomeric bearing includes both spherical bearing elements and planar bearing elements to allow for tilt of the driven ring axis of rotation with respect to the drive ring axis of rotation while ensuring a constant rotational velocity of the driven ring with respect to the rotational velocity of the drive ring.

Alternatively or additionally, in this or other embodiments, each elastomeric bearing includes an intermediate race separating the spherical bearing elements from the planar bearing elements.

Alternatively or additionally, in this or other embodiments, each elastomeric bearing includes an inner bearing race interfacing with the respective drive link of the plurality of drive links, the spherical bearing elements located between the inner bearing race and the intermediate race.

Alternatively or additionally, in this or other embodiments, each elastomeric bearing includes an outer bearing race interfacing with the driven ring, the planar bearing elements located between the outer bearing race and the intermediate race.

Alternatively or additionally, in this or other embodiments, a gimbal bearing is connected to the driven ring which reacts the tilt of the driven ring relative to the drive ring.

In another embodiment, a rotor assembly includes a rotor hub and a plurality of rotor blades extending radially outwardly from the rotor hub. A constant velocity drive operably connects the rotor hub to a rotor shaft and includes a drive ring having a drive ring axis of rotation and which is operably connectible to the rotor shaft. A plurality of drive links extend from the drive ring toward the rotor hub to transfer torque applied at the drive ring to the rotor hub. A plurality of elastomeric bearings are operably connected to the rotor hub to transfer torque from one of the plurality of drive links to the rotor hub. Each elastomeric bearing includes both spherical bearing elements and planar bearing elements to allow for tilt of an axis of rotation of the rotor hub with respect to the drive ring axis of rotation while ensuring a constant rotational velocity of the rotor hub with respect to the rotational velocity of the drive ring.

Alternatively or additionally, in this or other embodiments, a driven ring is secured to the rotor hub and is positioned between the rotor hub and the drive ring and driven by the drive ring to rotate about a driven ring axis of rotation. The plurality of elastomeric bearings are located at the driven ring.

Alternatively or additionally, in this or other embodiments, a gimbal bearing is connected to the driven ring and reacts the tilt of the driven ring relative to the drive ring.

Alternatively or additionally, in this or other embodiments, each elastomeric bearing includes an intermediate race separating the spherical bearing elements from the planar bearing elements.

Alternatively or additionally, in this or other embodiments, each elastomeric bearing includes an inner bearing race interfacing with the respective drive link of the plurality of drive links, the spherical bearing elements located between the inner bearing race and the intermediate race.

Alternatively or additionally, in this or other embodiments, each elastomeric bearing includes an outer bearing race, the planar bearing elements located between the outer bearing race and the intermediate race.

In yet another embodiment, a rotorcraft includes an airframe and a drive system disposed at the airframe. The drive system includes a drive shaft rotating about a shaft axis. A rotor assembly is operably connected to the drive system and includes a rotor hub and a plurality of rotor blades extending radially outwardly from the rotor hub. A constant velocity drive operably connects the rotor hub to the rotor shaft and includes a drive ring having a drive ring axis of rotation and which is operably connectible to the rotor shaft. A plurality of drive links extend from the drive ring toward the rotor hub to transfer torque applied at the drive ring to the rotor hub. A plurality of elastomeric bearings are operably connected to the rotor hub to transfer torque from one of the plurality of drive links to the rotor hub. Each elastomeric bearing includes both spherical bearing elements and planar bearing elements to allow for tilt of an axis of rotation of the rotor hub with respect to the drive ring axis of rotation while ensuring a constant rotational velocity of the rotor hub with respect to the rotational velocity of the drive ring.

Alternatively or additionally, in this or other embodiments, a driven ring is secured to the rotor hub and positioned between the rotor hub and the drive ring and driven by the drive ring to rotate about a driven ring axis of rotation. The plurality of elastomeric bearings are located at the driven ring.

Alternatively or additionally, in this or other embodiments, a gimbal bearing is connected to the driven ring and reacts the tilt of the driven ring relative to the drive ring.

Alternatively or additionally, in this or other embodiments, each elastomeric bearing includes an intermediate race separating the spherical bearing elements from the planar bearing elements.

Alternatively or additionally, in this or other embodiments, each elastomeric bearing includes an inner bearing race interfacing with the respective drive link of the plurality of drive links, the spherical bearing elements positioned between the inner bearing race and the intermediate race.

Alternatively or additionally, in this or other embodiments, each elastomeric bearing includes an outer bearing race, the planar bearing elements located between the outer bearing race and the intermediate race.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
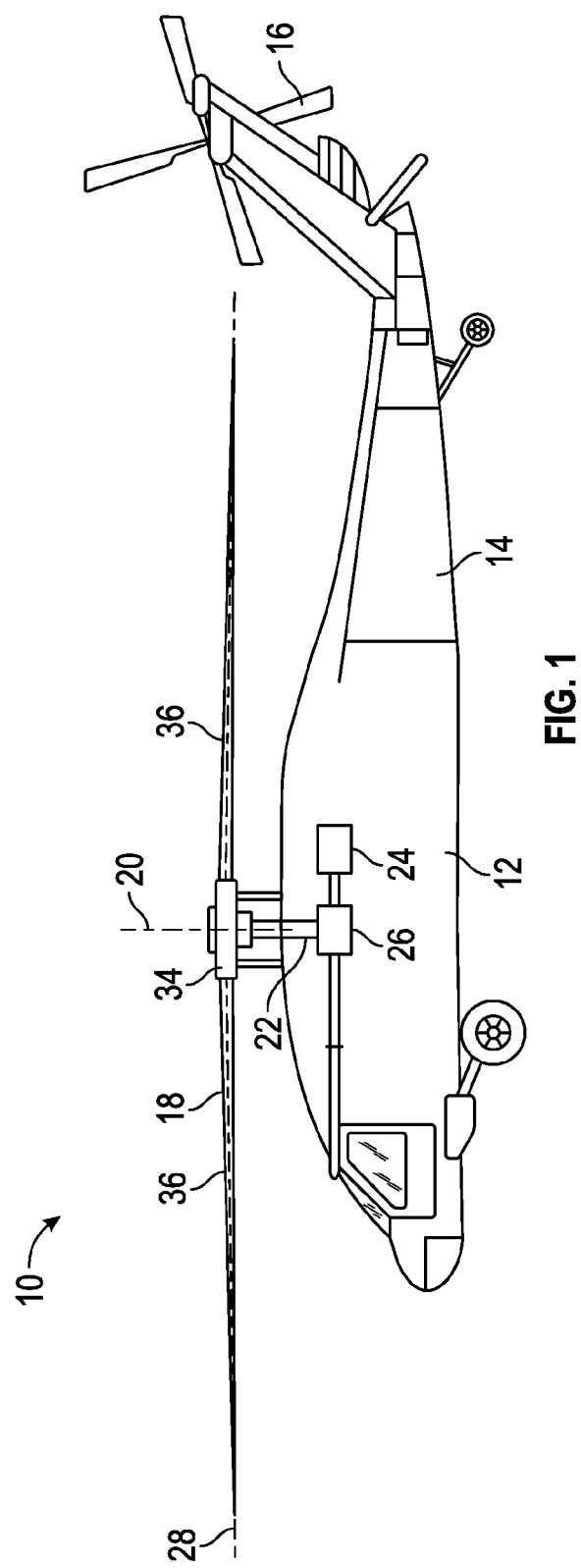
FIG. 1 is a schematic view of an embodiment of a rotorcraft.

Shown in FIG. 1 is schematic view of an embodiment of rotorcraft, in this embodiment a helicopter 10. The helicopter 10 includes an airframe 12 with an extending tail 14 and a tail rotor 16 located thereat. While the embodiment of a helicopter 10 described herein includes an extending tail 14 and tail rotor 16, it is to be appreciated that the disclosure herein may be applied to other types of rotor craft, such as tilt wing or tilt rotor vertical takeoff and landing (VTOL) aircraft. A main rotor assembly 18 is located at the airframe 12 and is driven by a rotor shaft 22 rotating about a rotor axis 20. The rotor shaft 22 is connected to a power source, for example, an engine 24 by a gearbox 26.

Figure 2:
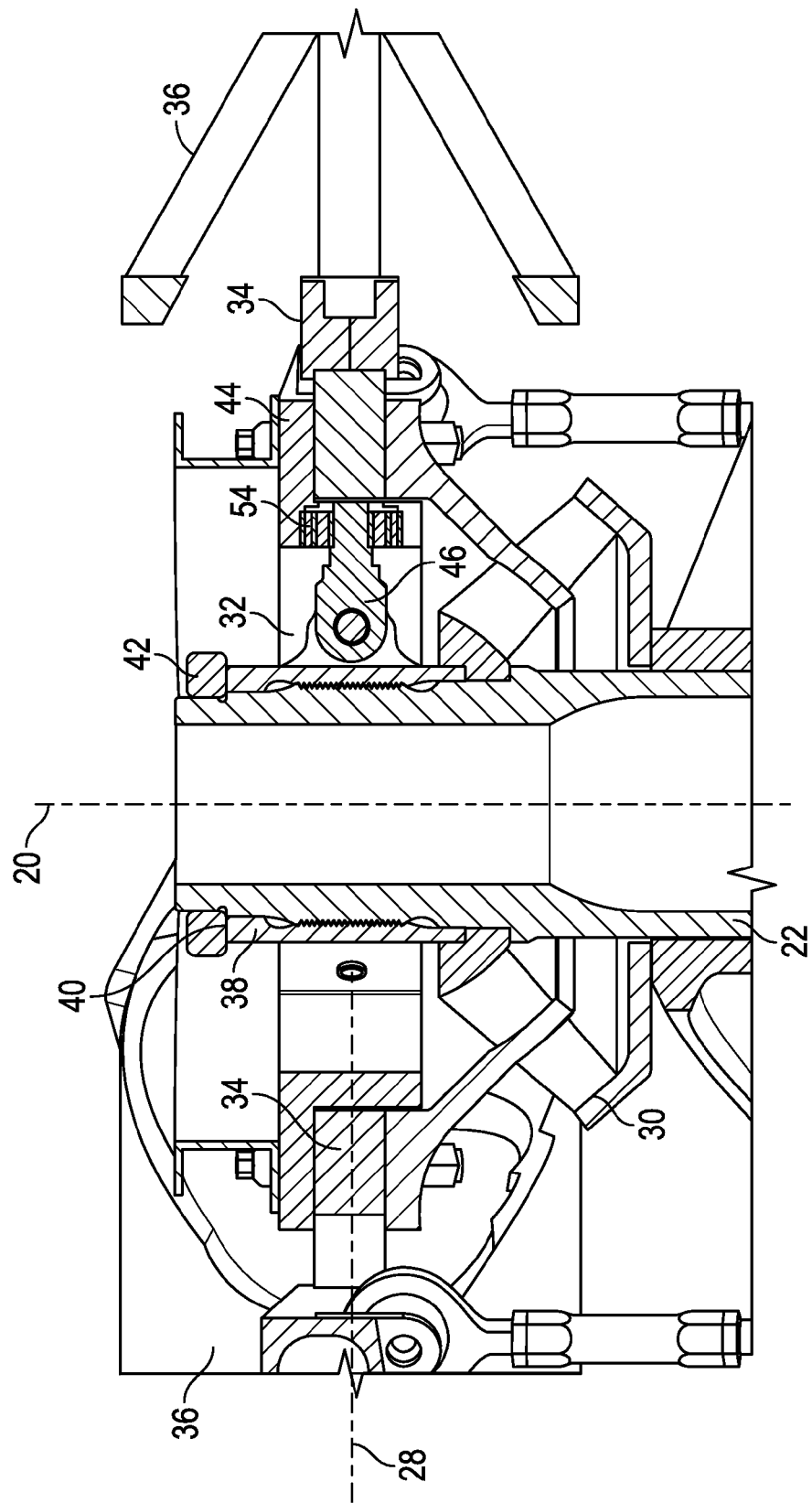
FIG. 2 is a cross-sectional view of an embodiment of a rotor assembly.
Figure 3:
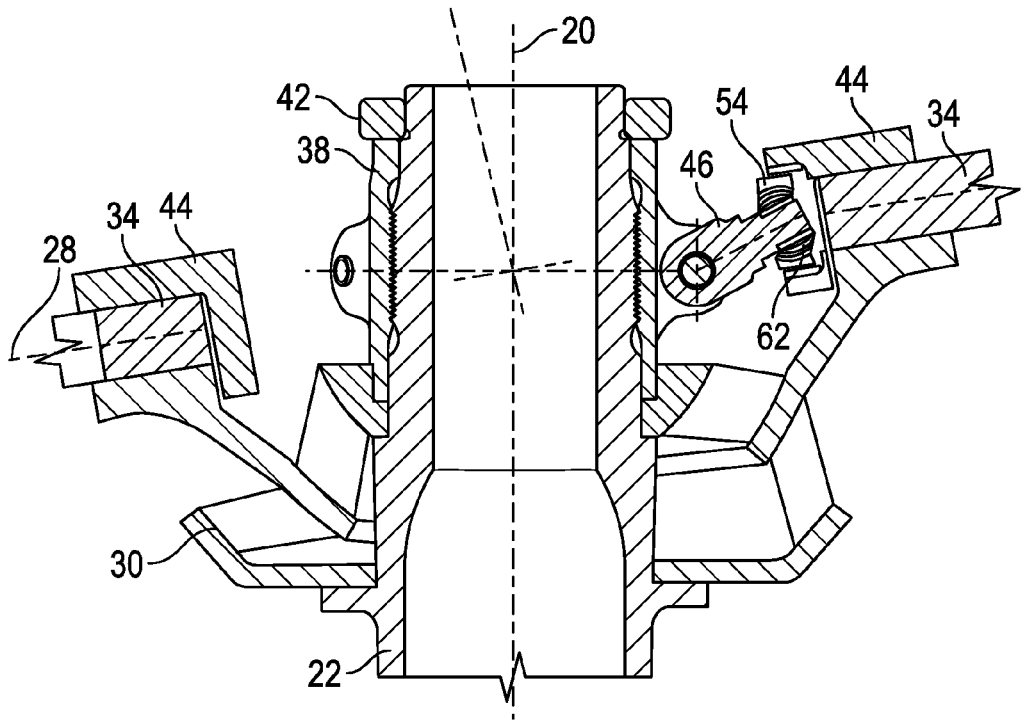
FIG. 3 is a cross-sectional view of an embodiment of a tilted rotor assembly.

Referring to FIG. 2, the main rotor assembly 18 rotates in a rotation plane 28 nominally perpendicular to the rotor axis 20. The main rotor assembly 18 includes a gimbal bearing 30 allowing for tilt of the rotation plane 28 as desired relative to the rotor axis 20, as shown in FIG. 3, so that the rotation plane 28 is no longer perpendicular to the rotor axis 20. To drive rotation of the rotor assembly 18 while accommodating the tilt of the rotation plane 28, the rotor assembly 18 is connected to the rotor shaft 22 by a constant velocity drive 32.

Referring again to FIG. 2, the rotor assembly 18 includes a rotor hub 34 with a plurality of rotor blades 36 extending radially outwardly from the rotor hub 34. The gimbal bearing 30 and the constant velocity drive 32 are secured to the rotor hub 34 to allow for tilt thereof. The gimbal bearing 30 is further secured to the rotor shaft 22, although it is understood that the gimbal bearing 30 could also be attached to the drive ring 38. The constant velocity drive 32 (hereinafter referred to as "drive 32") includes a drive ring 38 connected to the rotor shaft 22 via a drive spline 40 or other suitable connection and retained axially by a retaining ring 42. The drive 32 further includes a driven ring 44 fixed to the rotor hub 34 and three or more drive links 46 extending between the drive ring 38 and the driven ring 44.

Figure 4:
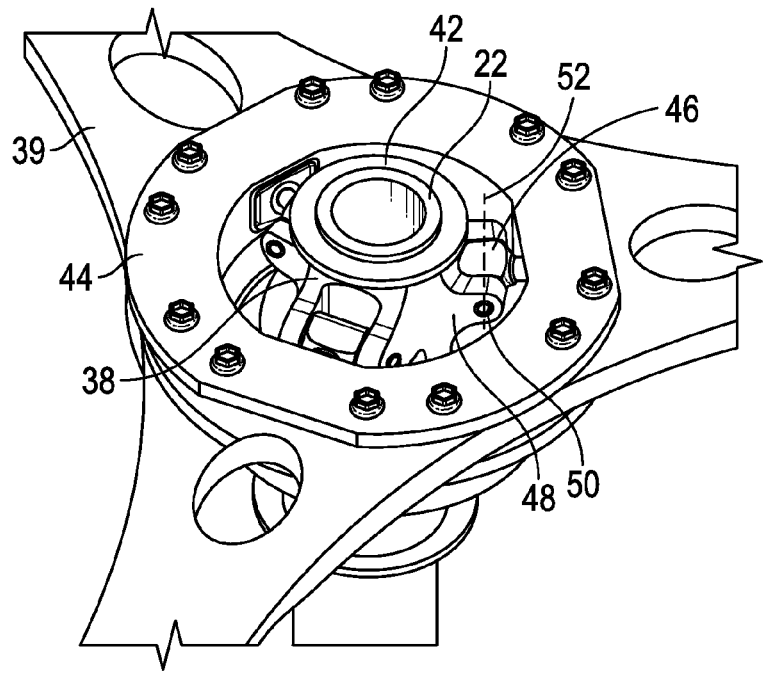
FIG. 4 is a perspective view of an embodiment of a rotor assembly.

As shown in FIG. 4, each drive link 46 is secured to the drive ring 38 at a clevis 48 of the drive ring 38, with a pin 50 extending through the clevis 48 allowing for rotation of the drive link 46 about a pin axis 52. Torque is transmitted from the rotor shaft 22 to the drive ring 38 via the drive spline 40, and from the drive ring 38 to the drive links 46 via the clevis 48. As shown, the clevis 48 has two prongs extending from the ring 38 through which the pin 50 extends to rotatably couple the drive ring 38 and the drive link 46. However, it is understood that other attachment mechanisms can be used, such as where the clevis 48 has fewer or more prongs than what is shown in the exemplary embodiment.

Figure 5:
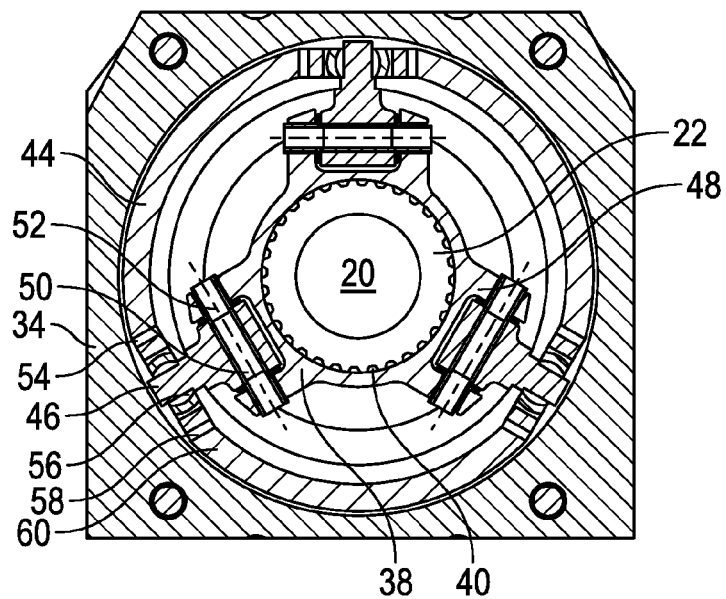
FIG. 5 is another cross-sectional view of an embodiment of a rotor assembly.
Figure 6:
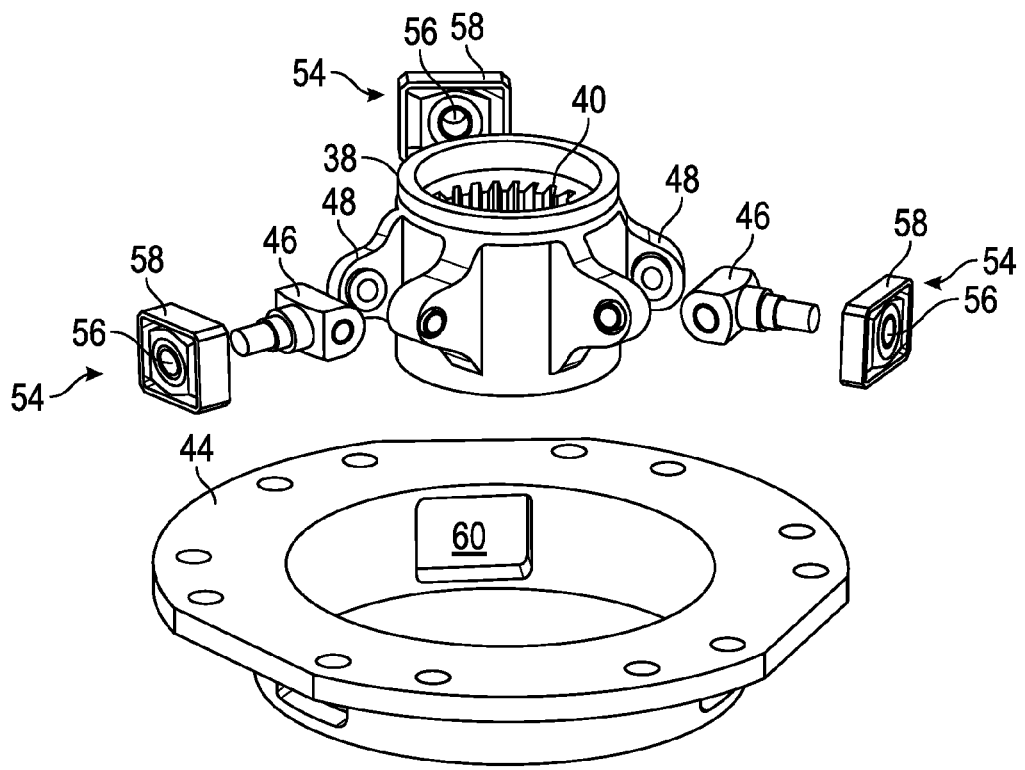
FIG. 6 is an exploded view of an embodiment of a rotor assembly.

Referring now to FIG. 5, each drive link 46 extends to the driven ring 44 and is supported at the driven ring 44 by an elastomeric bearing 54, through which torque is transmitted from the drive links 46 to the driven ring 44. The elastomeric bearing 54, shown also in the partially exploded view of FIG. 6, includes an inner race 56 forming the interface with the drive link 46, and an outer race 58 to interface with the driven ring 44. In some embodiments, the outer race 58 is square or rectangular and fits into a bearing opening 60 in the driven ring 44, although the particular shape is not so limited according to the shape of the opening 60.

Figure 7:
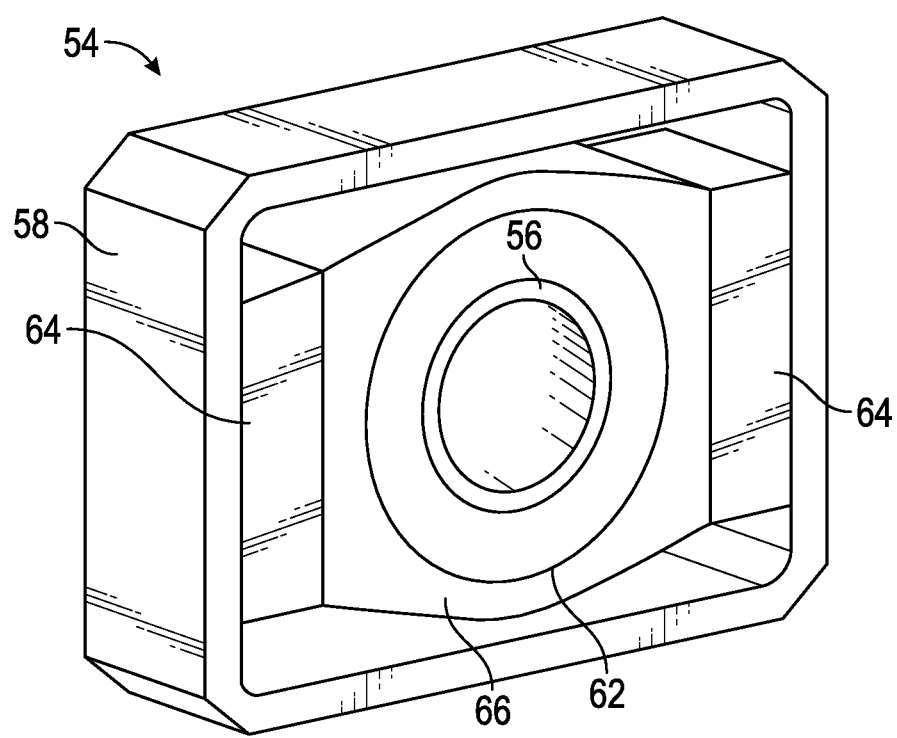
FIG. 7 is a perspective view of a bearing for a rotor assembly.

Referring now to FIG. 7, the elastomeric bearing 54 includes both spherical elements 62 and flat plate elements 64. In some embodiments, the spherical elements 62 and the flat plate elements, or planar elements 64 are separated by an intermediate race 66, with the spherical elements 62 positioned between the inner race 56 and the intermediate race 66 and the planar elements 64 positioned between the intermediate race 66 and the outer race 68. The spherical elements 62 accommodate the tilt of the rotor assembly 18, while the planar elements 64 allow for the foreshortening on a distance between the driven ring 44 and the drive ring 42 due to the tilt.

Additionally, as the rotor hub 34 is tilted, a center-to-center distance between the spherical portions of the elastomeric bearings 54 varies as the rotor hub 34 and rotor shaft 22 rotate about their respective axes. This expansion and contraction of the center-to-center distance results in a forced tangential deflection of each elastomeric bearing 54. As each elastomeric bearing 54 has the same spring rate, the tangential deflection is equally shared by the three elastomeric bearings 54. This equalization of deflections ensures a constant velocity joint between the rotor hub 34 and the rotor shaft 22.

While the invention has been described in detail in connection with only a limited number of embodiments, it should be readily understood that the invention is not limited to such disclosed embodiments. For instance, while described in terms of aircraft, it is understood that aspects could be used in other contexts such as for wind turbines, maritime propulsion, or other technologies in which a rotating element's plan of rotation will vary from perpendicular with the axis of rotation of a shaft driving the rotating element. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A constant velocity drive comprising;
a drive ring having a drive ring axis of rotation;
a driven ring disposed around the drive ring and which is driven by the drive ring to rotate about a driven ring axis of rotation;
a plurality of drive links extending from the drive ring to the driven ring to transfer torque applied at the drive ring to the driven ring, each of the drive links comprising an extended portion with an outer surface; and
a plurality of elastomeric bearings, each elastomeric bearing disposed in contact with and between the driven ring and the outer surface of the extended portion of one of the plurality of drive links to transfer torque from one of the plurality of drive links to the driven ring, each elastomeric bearing including both spherical bearing elements and planar bearing elements to allow for tilt of the driven ring axis of rotation with respect to the drive ring axis of rotation while ensuring a constant rotational velocity of the driven ring with respect to the rotational velocity of the drive ring wherein a center to center distance between the spherical bearing elements of the elastomeric bearings varies as the driven ring and drive ring rotate about their respective axes of rotation.

2. The constant velocity drive of claim 1, further comprising a gimbal bearing connected to the driven ring and which reacts the tilt of the driven ring relative to the drive ring.

3. The constant velocity drive of claim 1, wherein each elastomeric bearing includes an intermediate race separating the spherical bearing elements from the planar bearing elements.

4. The constant velocity drive of claim 3, wherein each elastomeric bearing includes an inner bearing race interfacing with the respective drive link of the plurality of drive links, the spherical bearing elements disposed between the inner bearing race and the intermediate race.

5. The constant velocity drive of claim 3, wherein each elastomeric bearing includes an outer bearing race interfacing with the driven ring, the planar bearing elements disposed between the outer bearing race and the intermediate race.

6. A rotor assembly comprising:
a rotor hub;
a plurality of rotor blades extending radially outwardly from the rotor hub;
a constant velocity drive operably connecting the rotor hub to a rotor shaft including;
a drive ring having a drive ring axis of rotation and which is operably connectible to the rotor shaft;
a plurality of drive links extending from the drive ring toward the rotor hub to transfer torque applied at the drive ring to the rotor hub, each of the drive links comprising an extended portion with an outer surface; and
a plurality of elastomeric bearings, each elastomeric bearing operably connected to the rotor hub and in surrounding contact with the outer surface of the extended portion of one of the plurality of drive linksto transfer torque from one of the plurality of drive links to the rotor hub, each elastomeric bearing including both spherical bearing elements and planar bearing elements to allow for tilt of an axis of rotation of the rotor hub with respect to the drive ring axis of rotation while ensuring a constant rotational velocity of the rotor hub with respect to the rotational velocity of the drive ring, wherein as the rotor hub is tilted, a center distance between the spherical bearing elements of the elastomeric bearings varies as the rotor hub and rotor shaft rotate about their respective axes of rotation.

7. The rotor assembly of claim 6, further comprising a driven ring secured to the rotor hub and interposed between the rotor hub and the drive ring and driven by the drive ring to rotate about a driven ring axis of rotation, the plurality of elastomeric bearings disposed at the driven ring.

8. The rotor assembly of claim 7, further comprising a gimbal bearing connected to the driven ring and which reacts the tilt of the driven ring relative to the drive ring.

9. The rotor assembly of claim 6, wherein each elastomeric bearing includes an intermediate race separating the spherical bearing elements from the planar bearing elements.

10. The rotor assembly of claim 9, wherein each elastomeric bearing includes an inner bearing race interfacing with the respective drive link of the plurality of drive links, the spherical bearing elements disposed between the inner bearing race and the intermediate race.

11. The rotor assembly of claim 9, wherein each elastomeric bearing includes an outer bearing race, the planar bearing elements disposed between the outer bearing race and the intermediate race.

12. A rotorcraft comprising:
an airframe;
a drive system disposed at the airframe, the drive system including a drive shaft rotating about a shaft axis; and
a rotor assembly operably connected to the drive system including:
a rotor hub;
a plurality of rotor blades extending radially outwardly from the rotor hub;
a constant velocity drive operably connecting the rotor hub to the rotor shaft including;
a drive ring operably connected to the rotor shaft and having a drive ring axis of rotation;
a plurality of drive links extending from the drive ring toward the rotor hub to transfer torque applied at the drive ring to the rotor hub, each of the drive links comprising an extended portion with an outer surface; and
a plurality of elastomeric bearings, each elastomeric bearing operably connected to the rotor hub and in surrounding contact with the outer surface of the extended portion of one of the plurality of drive links to transfer torque from one of the plurality of drive links to the rotor hub, each elastomeric bearing including both spherical bearing elements and planar bearing elements to allow for tilt of an axis of rotation of the rotor hub with respect to the drive ring axis of rotation while ensuring a constant rotational velocity of the rotor hub with respect to the rotational velocity of the drive ring, wherein as the rotor hub is tilted, a center distance between the spherical bearing elements of the elastomeric bearings varies as the rotor hub and rotor shaft rotate about their respective axes of rotation.

13. The rotorcraft of claim 12, further comprising a driven ring secured to the rotor hub and interposed between the rotor hub and the drive ring and driven by the drive ring to rotate about a driven ring axis of rotation, the plurality of elastomeric bearings disposed at the driven ring.

14. The rotorcraft of claim 12, further comprising a gimbal bearing connected to the driven ring and which reacts the tilt of the driven ring relative to the drive ring.

15. The rotorcraft of claim 12, wherein each elastomeric bearing includes an outer bearing race, the planar bearing elements disposed between the outer bearing race and the intermediate race.

16. The rotorcraft of claim 12, wherein each elastomeric bearing includes an intermediate race separating the spherical bearing elements from the planar bearing elements.

17. The rotorcraft of claim 16, wherein each elastomeric bearing includes an inner bearing race interfacing with the respective drive link of the plurality of drive links, the spherical bearing elements disposed between the inner bearing race and the intermediate race.

\* \* \* \* \*